US012175904B2

(12) United States Patent
Zhao et al.

(10) Patent No.: US 12,175,904 B2
(45) Date of Patent: Dec. 24, 2024

(54) LUMINANCE COMPENSATION METHOD, LUMINANCE COMPENSATION DEVICE, AND DISPLAY DEVICE

(71) Applicant: TCL China Star Optoelectronics Technology Co., Ltd., Guangdong (CN)

(72) Inventors: Yizhuo Zhao, Guangdong (CN); Qiusheng Huang, Guangdong (CN); Yuhua Chang, Guangdong (CN); Bin Zhao, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 309 days.

(21) Appl. No.: 17/281,620

(22) PCT Filed: Mar. 15, 2021

(86) PCT No.: PCT/CN2021/080745
§ 371 (c)(1),
(2) Date: Aug. 2, 2023

(87) PCT Pub. No.: WO2022/116408
PCT Pub. Date: Jun. 9, 2022

(65) Prior Publication Data

US 2023/0386378 A1 Nov. 30, 2023

(30) Foreign Application Priority Data

Dec. 4, 2020 (CN) ........................ 202011416367.3

(51) Int. Cl.
*G09G 3/20* (2006.01)

(52) U.S. Cl.
CPC ....... *G09G 3/20* (2013.01); *G09G 2320/0233* (2013.01); *G09G 2320/0247* (2013.01); *G09G 2320/0626* (2013.01)

(58) Field of Classification Search
CPC ... G09G 2320/0233; G09G 2320/0247; G09G 2320/0626; G09G 3/20; G09G 5/10
See application file for complete search history.

(56) References Cited

U.S. PATENT DOCUMENTS

2007/0103424 A1 5/2007 Huang
2009/0243995 A1 10/2009 Kimura
2010/0290532 A1 11/2010 Yamamoto et al.
(Continued)

FOREIGN PATENT DOCUMENTS

CN 102214450 10/2011
CN 103634463 3/2014
(Continued)

*Primary Examiner* — Ricardo Osorio

(57) ABSTRACT

The present application provides a luminance compensation method, a luminance compensation device, and a display device. Luminance compensation is performed on at least part of consecutive frames satisfying a condition of the luminance compensation, and the luminance compensation is not performed on the consecutive frames not satisfying the condition of the luminance compensation, thereby preventing a problem that the luminance compensation applied to a display device with free synchronization technology of traditional technology causing display of special images to deteriorate.

15 Claims, 3 Drawing Sheets

(56) References Cited

U.S. PATENT DOCUMENTS

| | | | | |
|---|---|---|---|---|
| 2014/0267370 | A1* | 9/2014 | Albrecht ................ | G09G 5/006 345/602 |
| 2015/0187286 | A1* | 7/2015 | Lee ....................... | G06F 3/1423 345/82 |
| 2016/0125813 | A1 | 5/2016 | Park | |
| 2017/0301297 | A1* | 10/2017 | Shang .................. | G09G 3/3648 |
| 2019/0258114 | A1 | 8/2019 | Kwon et al. | |
| 2020/0090596 | A1* | 3/2020 | Oh ........................... | G09G 3/36 |
| 2020/0152111 | A1 | 5/2020 | Lim et al. | |
| 2021/0400229 | A1* | 12/2021 | Chen ........................ | H04N 5/57 |

FOREIGN PATENT DOCUMENTS

| | | | | |
|---|---|---|---|---|
| CN | 104299602 | | | 1/2015 |
| CN | 105074807 | | | 11/2015 |
| CN | 105551425 | | | 5/2016 |
| CN | 106097983 | | | 11/2016 |
| CN | 108335677 | | | 7/2018 |
| CN | 108806620 | | | 11/2018 |
| CN | 108806620 | A | * | 11/2018 |
| CN | 108877714 | | | 11/2018 |
| CN | 110751933 | | | 2/2020 |
| CN | 111063288 | | | 4/2020 |
| CN | 111312191 | | | 6/2020 |
| CN | 111540331 | | | 8/2020 |
| CN | 111640390 | | | 9/2020 |
| KR | 102529152 | B1 | * | 5/2023 |

* cited by examiner

LUMINANCE COMPENSATION METHOD, LUMINANCE COMPENSATION DEVICE, AND DISPLAY DEVICE

RELATED APPLICATIONS

This application is a National Phase of PCT Patent Application No. PCT/CN2021/080745 having International filing date of Mar. 15, 2021, which claims the benefit of priority of Chinese Patent Application No. 202011416367.3 filed on Dec. 4, 2020. The contents of the above applications are all incorporated by reference as if fully set forth herein in their entirety.

FIELD AND BACKGROUND OF THE INVENTION

The present invention is related to the field of display technology and specifically to a luminance compensation method, a luminance compensation device, and a display device.

Currently, displays generally work at fixed frequencies, such as a most common frequency, 60 Hz. Under certain conditions, the displays are often required to display at higher refresh rates. Free synchronization technology enables graphics cards AMD and accelerated processors APU to directly and dynamically control a refresh rate of connected displays.

For a display equipped with the free synchronization technology, its charging time of each frame corresponding to a highest refresh rate and a lowest refresh rate is equal, and one difference between these refresh rates is that their blanking times between two frames are different. As shown in FIG. 1, when the refresh rate is high, a duration of each frame is longer due to a low frame rate, so the blanking time becomes longer compared to a high frame rate situation. An excessively long blanking time aggravates electrical leakage impact of a display device and ultimately reduces an overall luminance of the display device. As shown in FIG. 2, when the display device is alternately switched between different frequencies in a short time, a luminance corresponding to a high frequency (corresponding to a flat section at position 1) is greater and stable, and a luminance corresponding to a low frequency (corresponding to a fluctuating section at position 2) is less and fluctuates greatly. The luminance corresponding to the high frequency and the luminance corresponding to the low frequency vary significantly, and a difference in the luminance at different frequencies causes the display device to flicker severely.

For this serious flickering problem of the display device, as shown in FIG. 3, luminance compensation can be performed in low-frequency regions by modifying a grayscale data or adjusting a voltage to relieve the flicking problem of the display device, so as to minimize a luminance difference at different frequencies. However, for some special images, such as images displayed with a frequency randomly fluctuating around 60 Hz (e.g., game images), an original luminance difference with a slight difference becomes very obvious after the luminance compensation is performed, causing a subjective effect of the display device to greatly deteriorate.

Therefore, it is necessary to propose a technical solution to solve a problem that luminance compensation technology applied to display devices with the free synchronization technology causing display of special images to deteriorate.

SUMMARY OF THE INVENTION

A purpose of the present application is to provide a luminance compensation method, a luminance compensation device, and a display device to solve a problem that luminance compensation technology applied to the display device with free synchronization technology causing display of special images to deteriorate.

In order to achieve the above purpose, the present application provides a luminance compensation method. The luminance compensation method includes steps of:

detecting whether a frequency variation pattern of a first frame queue satisfies a condition of luminance compensation, wherein the first frame queue includes a plurality of consecutive frames;

if yes, turning on a luminance compensation module, wherein the luminance compensation module is configured to perform the luminance compensation on at least part of the consecutive frames in the first frame queue; and if no, turning off the luminance compensation module.

The present application further provides a luminance compensation device. The luminance compensation device includes:

a detection module configured to detect whether a frequency variation pattern of a first frame queue satisfies a condition of luminance compensation, wherein the first frame queue includes a plurality of consecutive frames; and a luminance compensation module configured to be turned on to perform the luminance compensation on at least part of the consecutive frames in the first frame queue if the frequency variation pattern of the first frame queue satisfies the condition of the luminance compensation, and further configured to be turned off if the frequency variation pattern of the first frame queue does not satisfy the condition of the luminance compensation.

The present application further provides a display device. the display device includes the above luminance compensation device.

The present application provides the luminance compensation method, the luminance compensation device, and the display device. The luminance compensation is performed on at least part of the consecutive frames satisfying the condition of the luminance compensation, and the luminance compensation is performed on the consecutive frames not satisfying the condition of the luminance compensation. While relieving a flickering problem, a problem that the luminance compensation applied to a display device with the free synchronization technology of traditional technology causing display of special images to deteriorate is prevented.

DESCRIPTION OF SPECIFIC EMBODIMENTS OF THE INVENTION

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the of the present application.

Figure 1:
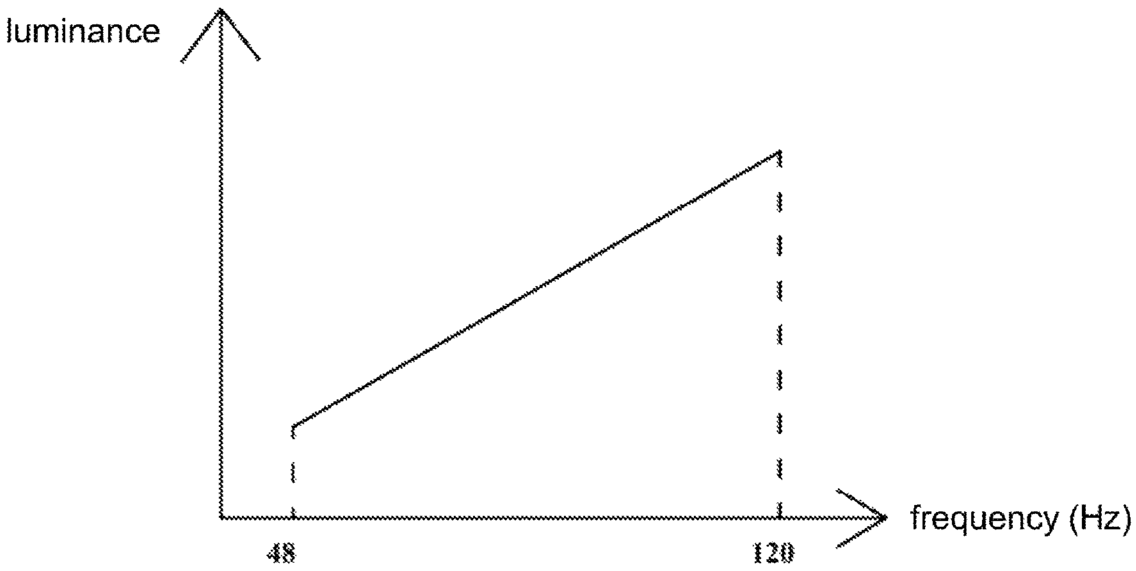
FIG. 1 is a frequency-luminance graph corresponding to a display device with free synchronization technology of traditional technology when no luminance compensation is performed.
Figure 2:
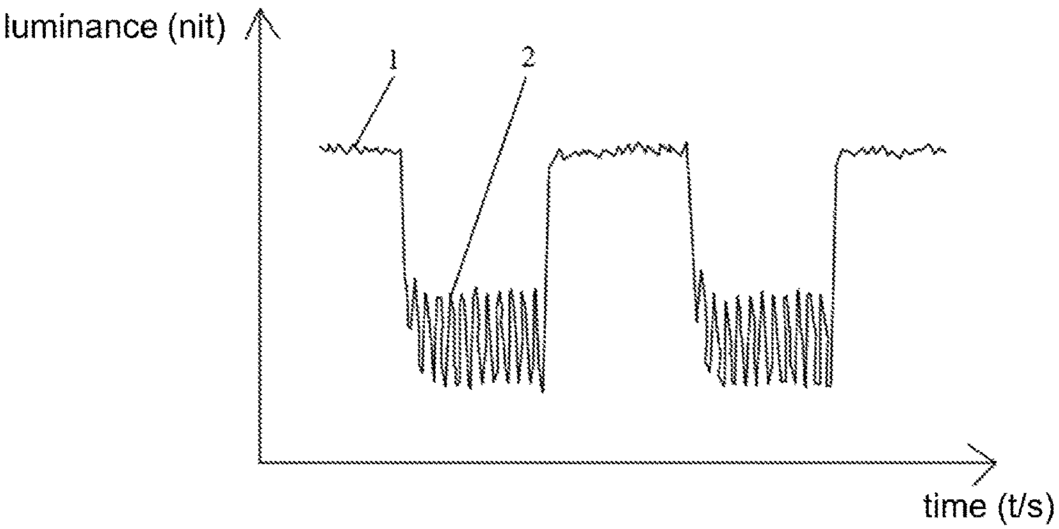
FIG. 2 is a time-luminance graph corresponding to the display device with the free synchronization technology of the traditional technology when no luminance compensation is performed.
Figure 3:
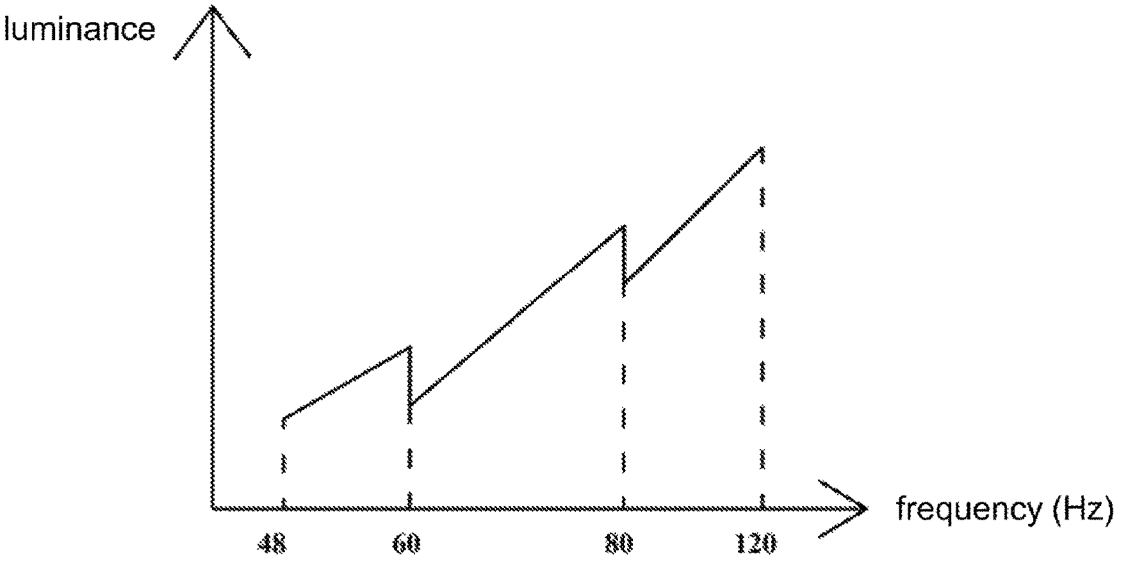
FIG. 3 is a frequency-luminance graph corresponding to the display device with the free synchronization technology of the traditional technology when the luminance compensation is performed.
Figure 4:
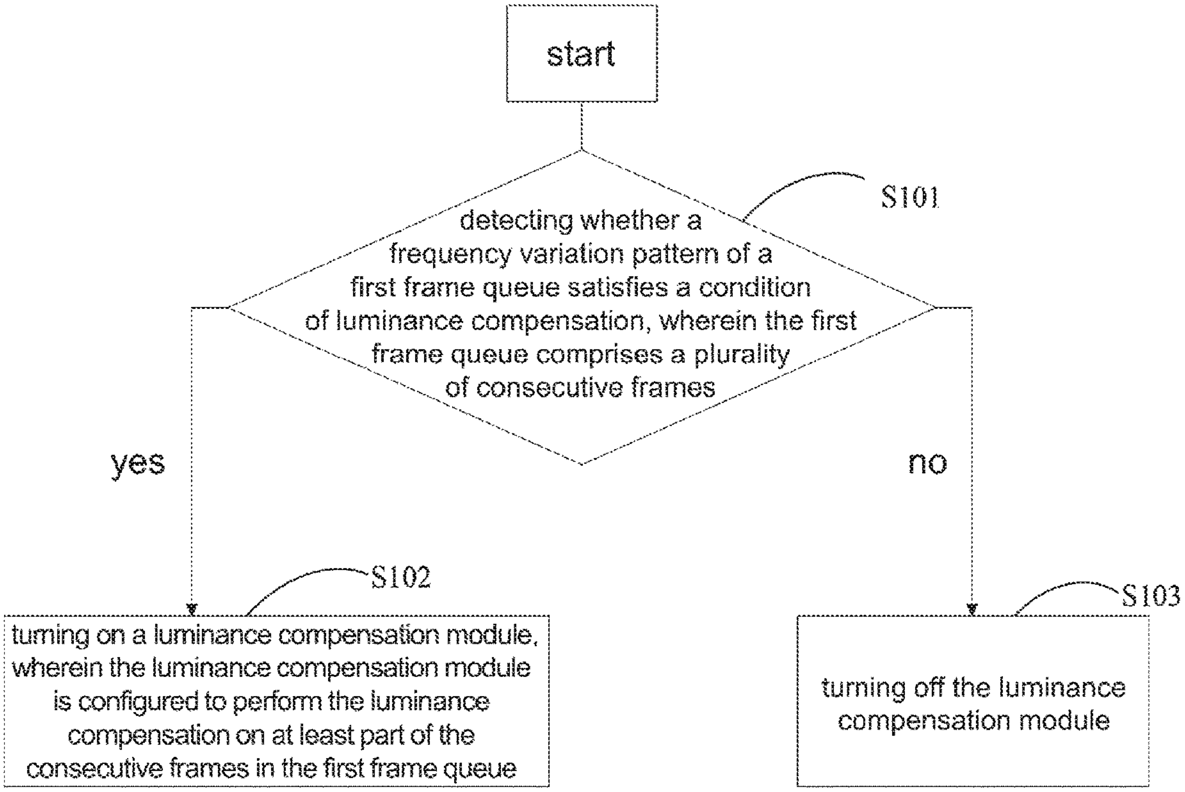
FIG. 4 is a flowchart of a luminance compensation method of an embodiment of the present application.

As shown in FIG. 4, which is a flowchart of a luminance compensation method of an embodiment of the present application, the luminance compensation method is applied to a display device with free synchronization technology, that is, the luminance compensation method is applied to the display device whose frequency of display can be adaptively changed. The luminance compensation method includes a step of:

S101: detecting whether a frequency variation pattern of a first frame queue satisfies a condition of luminance compensation, wherein the first frame queue includes a plurality of consecutive frames.

The plurality of consecutive frames of the first frame queue correspond to a scene of a display image. For the frequency variation pattern of the first frame queue, the display device adaptively adjusts according to an application scenario of an image to be displayed. For example, when a normal image is displayed, the display device adopts a continuous high-frequency pattern. For a game image, the display device adopts a high-frequency and low-frequency alternating pattern or a continuous low-frequency pattern.

For different frequency variation patterns, a degree of flicker on the display device is also different. Considering that the human eye can only recognize relatively serious flicker, and that continuous compensation applied on the display device adopting the free synchronization causes display of some special images to deteriorate, the condition of the luminance compensation of the present application is mainly aimed at those frequency variation patterns that cause more serious flickering problems.

In this embodiment, for detecting whether the frequency variation pattern of the plurality of consecutive frames satisfy the condition of the luminance compensation, the present application proposes a first solution and a second solution. The first solution is suitable for detection during a period after the display device is turned on, and the second solution is suitable for detection during a stable display process. The first solution and the second solution are two parallel solutions.

The first solution is: detecting whether the frequency variation pattern of the first frame queue is a first pattern. Under the first pattern, a frequency of the plurality of consecutive frames in the first frame queue continuously alternates at least twice between a first frequency and a second frequency. An absolute value of a difference between the first frequency and the second frequency is greater than or equal to a first preset threshold. The condition of the luminance compensation includes the first pattern.

It should be explained that every time the first frequency and the second frequency alternate, the first frequency can correspond to one frame, the first frequency can also correspond to the plurality of consecutive frames, the second frequency can correspond to one frame, and the second frequency can also correspond to the plurality of consecutive frames.

Because the plurality of consecutive frames have obvious flickering problem in the first pattern, when the plurality of consecutive frames are under the first pattern, the luminance compensation needs to be performed on the plurality of consecutive frames to relieve the flickering problem when the plurality of consecutive frames are displayed.

Specifically, when a first frame queue sequentially including a first high frequency, a first low frequency, a second high frequency, and a second low frequency is detected, or when a first frame queue sequentially including the first low frequency, the first high frequency, the second low frequency, and the second high frequency is detected, the first high frequency and the second high frequency are compared to determine whether they are equal, and the first low frequency and the second low frequency are compared to determine whether they are equal. If the first high frequency and the second high frequency are equal, the first low frequency and the second low frequency are equal, and a difference between the first high frequency and the first low frequency is greater than or equal to the first preset threshold, the frequency corresponding to a frequency of the plurality of consecutive frames continuously alternates at least twice between the first frequency and the second frequency. Furthermore, the absolute value of the difference between the first frequency and the second frequency is greater than or equal to the first preset threshold, that is, the frequency variation pattern of the first frame queue satisfies the condition of the luminance compensation. The first high frequency is greater than the first low frequency, and the second high frequency is greater than the first low frequency and the second low frequency.

In this embodiment, the first preset threshold ranges from 6 Hz to 12 Hz, which leads to the serious flickering problem of the plurality of consecutive frames in the first frame queue alternating at least twice between a fixed high frequency and a fixed low frequency. For example, the first preset threshold can be 6 Hz, 10 Hz, and 11 Hz. The first frequency is greater than or equal to 20 Hz, and the second frequency is greater than or equal to 20 Hz. The first frequency can be 40 Hz, 60 Hz, 80 Hz, 100 Hz, 120 Hz, 140 Hz, 160 Hz, or greater than 160 Hz. The second frequency can be 40 Hz, 60 Hz, 80 Hz, 100 Hz, 120 Hz, 140 Hz, 160 Hz, or greater than 160 Hz.

Under the first solution, if yes, step S102 is performed. A luminance compensation module is turned on. The luminance compensation module is configured to perform the luminance compensation on at least part of the consecutive frames in the first frame queue, thereby relieving the flickering problem.

Specifically, if yes, a first luminance compensation switch (not shown) is turned on. The first luminance compensation switch is connected in series with the luminance compensation module. The first luminance compensation switch can be a register. When the first luminance compensation switch is turned on, the luminance compensation module is turned on. The luminance compensation module performs the luminance compensation on at least part of the consecutive frames in the first frame queue satisfying the condition of the luminance compensation.

Figure 6:
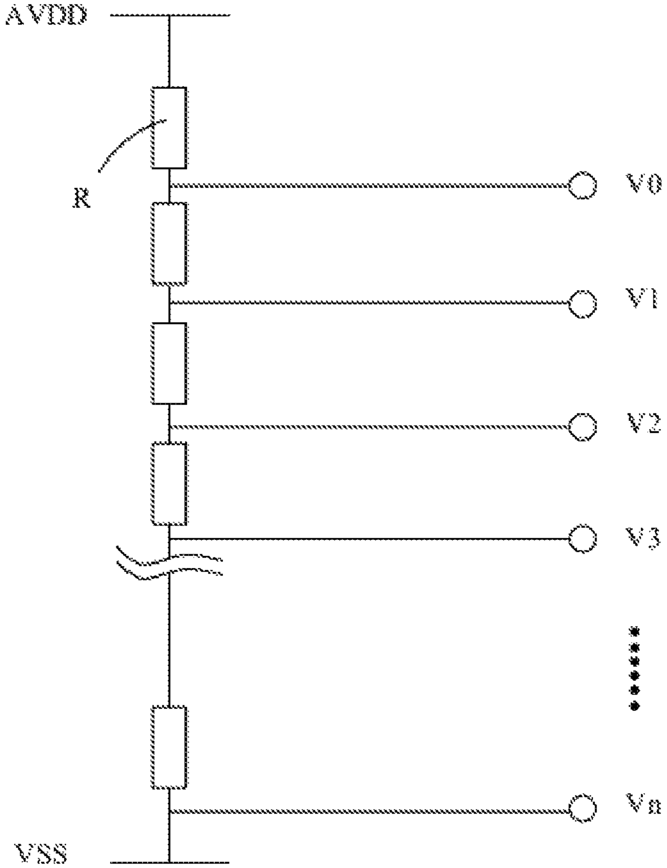
FIG. 6 is a schematic diagram of a gamma voltage circuit.

In this embodiment, a luminance compensation principle of the luminance compensation module can be a common technical means. For example, as shown in FIG. 6, which is a schematic diagram of a gamma voltage circuit, the gamma voltage circuit includes a first direct current voltage AVDD, a second direct current voltage VSS, a plurality of resistors R connected between the first direct current voltage AVDD and the second direct current voltage VSS, and a plurality of voltage output ends (including V0, V1, V2, V3, and Vn) are drawn between two adjacent resistors R. A frequency domain of the entire display device is divided into intervals, and the first direct current voltage AVDD in each frequency domain interval adopts a compensation parameter. The luminance compensation is performed in the frequency domain intervals by adjusting the first direct current voltage AVDD.

Specifically, a frequency adjustment range supported by the display device ranges from 48 Hz to 120 Hz. When an accuracy of the first direct current voltage AVDD is 0.2 V/gear, the first direct current voltage AVDD corresponding to a frequency domain ranging from 48 Hz to 60 Hz is increased by 0.4V, the first direct current voltage AVDD corresponding to a frequency domain ranging from 61 Hz to 80 Hz is increased by 0.2V, and the first direct current voltage AVDD corresponding to a frequency domain ranging from 81 Hz to 120 Hz remains unchanged. The luminance compensation is performed in the frequency domain intervals by adjusting the first direct current voltage AVDD.

Understandably, the luminance compensation module can also directly adjust the gamma voltage through an output voltage of a power management integrated chip (PMIC), and achieves the luminance compensation by directly adjusting the gamma voltage. The luminance compensation module can also adopt other commonly used luminance compensation methods.

If no, step S103 is performed. the luminance compensation module is turned off. The luminance compensation is not performed on the plurality of consecutive frames corresponding to the frequency variation pattern not satisfying the condition of the luminance compensation, so the luminance compensation is prevent from causing the special images to further deteriorate. In particular, a subjective effect deterioration caused by random fluctuation of a frequency around switch points (e.g., 60 Hz and 80 Hz) during the above luminance compensation performed in the frequency domain interval can be prevented.

Specifically, during detection of the first solution, if the frequency of the plurality of consecutive frames in the first frame queue is detected to have not changed, which means that when the frequency of the plurality of consecutive frames in the first frame queue are at a fixed frequency, the first luminance compensation switch is directly turned off, and a luminance compensation function is then turned off. In addition, if the frequency of the plurality of consecutive frames in the first frame queue is detected to be increasing or decreasing, the first luminance compensation switch is directly turned off, and the luminance compensation function is then turned off. A trend of the increasing frequency can sequentially be 50 Hz, 80 Hz, and 110 Hz. A trend of the decreasing frequency can be deduced from analogy, which is not described in detail herein.

Furthermore, in the first solution, before the step of detecting whether the frequency variation pattern of the first frame queue satisfies the condition of the luminance compensation, the luminance compensation method further includes a step of:

detecting whether a frequency of a plurality of consecutive frames in a second frame queue changes, and if yes, stopping detection and waiting a first preset time.

The second frame queue is before the first frame queue, and an interval duration between the first frame queue and the second frame queue is equal to the first preset time.

Before detecting whether the frequency variation pattern of the first frame queue satisfies the condition of the luminance compensation, if the frequency of the plurality of consecutive frames in the second frame queue before the first frame queue is detected to change, the first preset time is waited to stabilize signals, so as to prevent signal instability from causing errors in the detection of the frequency variation pattern of the first frame queue. The change in the frequency of the plurality of consecutive frames in the second frame queue means that the frequencies of at least two frames in the second frame queue are not equal. Changes in the frequency of the plurality of consecutive frames in the second frame queue include cases where the luminance compensation is not required for slight flicker and cases where the luminance compensation is required for severe flicker.

In this embodiment, the first preset time can correspond to a duration corresponding to the plurality of consecutive frames. For example, the first preset time can correspond to a duration corresponding to 20 to 500 consecutive frames. If the first preset time is too short, a signal stability cannot be guaranteed, and if the first preset time is too long, it is not conducive to rapid detection and compensation. The first preset time can be a duration corresponding to 100 frames, a duration corresponding to 200 frames, or a duration corresponding to 300 frames.

The second solution is: detecting whether the frequency variation pattern of the first frame queue is a second pattern. The second pattern includes a first sub-pattern and a second sub-pattern, which are continuous. The condition of the luminance compensation includes the second pattern.

Under the first sub-pattern, a frequency of adjacent two of the consecutive frames changes from a third frequency to a fourth frequency. The third frequency is greater than the fourth frequency. A difference between the third frequency and the fourth frequency is greater than or equal to a second preset threshold.

Under the second sub-pattern, in at least two of the consecutive frames, a difference between a frequency of a next one of the consecutive frames and a frequency of a previous one of the consecutive frames is greater than or equal to zero and is less than or equal to a third preset threshold.

The second solution is mainly suitable for detection and compensation in a process of a stable display. Under the second pattern, the first sub-pattern and the second sub-pattern continuously alternate at least once. Because the first sub-pattern and the second sub-pattern are quickly switched, and a frequency in the first sub-pattern drops from a third frequency to a fourth frequency, the flicker is more obvious. Therefore, the luminance compensation needs to be performed on a first frame in the second pattern.

In this embodiment, the second preset threshold is greater than the first preset threshold. The second preset threshold ranges from 50 Hz to 70 Hz. For example, the second preset threshold is 60 Hz. The second preset threshold can also be equal to a difference between a maximum frequency and a minimum frequency. For example, a frequency of the display device ranges from 48 Hz to 120 Hz, and the second preset threshold can be 72 Hz.

In this embodiment, under the first sub-pattern, a frequency of some consecutive frames jumps from a larger frequency to a smaller frequency, and the frequency has a huge gap. Under the second sub-pattern, the third preset threshold ranges from 1 Hz to 2 Hz, and a frequency of some consecutive frames gradually increases or almost does not change. Frames in the second sub-pattern can include two consecutive frames, three consecutive frames, or more than three consecutive frames.

Specifically, under the first sub-pattern, a frequency of some consecutive frames jumps from a highest frequency of the display device to a lowest frequency of the display device. Under the second sub-pattern, in three consecutive frames, a difference between a frequency of a next frame and a frequency of a previous frame is greater than or equal to zero and is less than or equal to 2 Hz. Under the second sub-pattern, if a number of the consecutive frames is greater than three, a difficulty of satisfying the condition of the luminance compensation is increased. the present application is based on a large number of experimental investigations, and the number of the consecutive frames of three is a best choice to satisfy flicker detection and requirements of detection.

In this embodiment, under the second pattern, the first sub-pattern and the second sub-pattern need to be satisfied at a same time to satisfy the condition of the luminance compensation.

In the second solution, if the condition of the luminance compensation is satisfied, a second luminance compensation switch (not shown) is turned on. The second luminance compensation switch is connected in series with the luminance compensation module. When the second luminance compensation switch is turned on, the luminance compensation module is turned on to perform the above step S102. The second luminance compensation switch is connected in parallel with the first luminance compensation switch. The second luminance compensation switch is also a register.

In the second solution, if the condition of the luminance compensation is not satisfied, the above step S103 is performed. Specifically, the luminance compensation module is turned off by turning off the second luminance compensation switch.

For the above first and second solutions, the following solutions are applicable.

In this embodiment, after the step of the turning off the luminance compensation module, the luminance compensation method further includes steps of:

waiting a second preset time;

detecting whether a frequency variation pattern of a plurality of consecutive frames in a third frame queue after the second preset time satisfies the condition of the luminance compensation;

if yes, turning on the luminance compensation module, wherein the luminance compensation module performs the luminance compensation on at least part of the consecutive frames in the third frame queue; and if no, turning off the luminance compensation module.

When the detection of the first frame queue is completed and the first frame queue does not satisfy the condition of the luminance compensation, the luminance compensation module is turned off. A detection interval of the second preset time is waited, and detection of the third frame queue after the second preset time is continued. The detection of the third frame queue is same as the detection of the first frame queue, and the above first and second solutions can be adopted. If a frequency variation pattern of the third frame queue satisfies the condition of the luminance compensation, the luminance compensation on at least part of the frames in the third frame queue is performed. If the frequency variation pattern of the third frame queue does not satisfy the condition of the luminance compensation, the frames in the third frame queue are not compensated.

The third preset time corresponds to a duration corresponding to 250 to 350 frames. Specifically, the third preset time corresponds to a duration corresponding to 300 frames.

In this embodiment, after the step of turning on the luminance compensation module, the luminance compensation method further includes steps of:

detecting whether a frequency variation pattern of a plurality of consecutive frames in a fourth frame queue after the first frame queue satisfies the condition of the luminance compensation;

if yes, keeping the luminance compensation module turned on, wherein the luminance compensation module performs the luminance compensation on at least part of the consecutive frames in the fourth frame queue; and if no, turning off the luminance compensation module which has been turned on.

After completing the luminance compensation of at least part of the consecutive frames of the first frame queue, the frequency variation pattern of the plurality of consecutive frames in the fourth frame queue after the first frame queue continue to be detected. Detection of the fourth frame queue is same as the detection of the first frame queue. The first solution or the second solution can be adopted, which is not described in detail herein. If the frequency variation pattern of the fourth frame queue satisfies the condition of the luminance compensation, the brightness compensation module is kept turning on to perform the luminance compensation on at least part of the consecutive frames in the fourth frame queue. If the frequency variation pattern of the fourth frame queue does not satisfy the condition of the luminance compensation, the luminance compensation module, which has been turned on, is turned off.

The luminance compensation method provided by the present application performs the luminance compensation on at least part of the consecutive frames satisfying the condition of the luminance compensation, and performs the luminance compensation on the consecutive frames not satisfying the condition of the luminance compensation. While relieving the flickering problem, a problem that the luminance compensation applied to the display device with the free synchronization technology of traditional technology causing the display of the special images to deteriorate is prevented.

Figure 5:
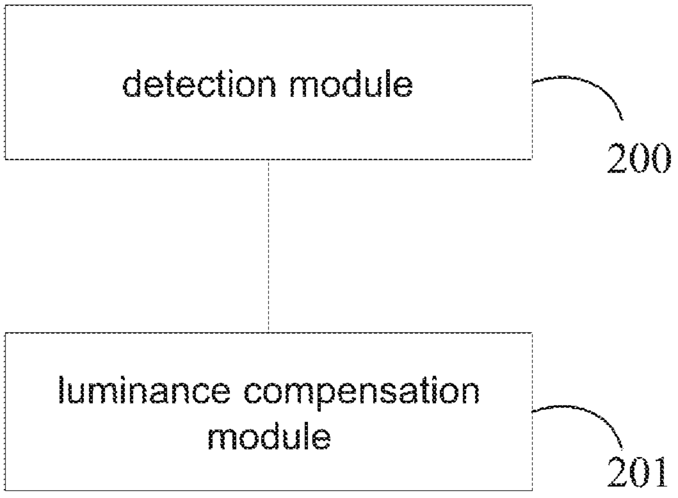
FIG. 5 is a block diagram of a luminance compensation device of an embodiment of the present application.

The present application further provides a luminance compensation device. The luminance compensation device is applied to a display device adopt the free synchronization technology. As shown in FIG. 5, the luminance compensation device includes:

a detection module 200 configured to detect whether a frequency variation pattern of a first frame queue satisfies a condition of luminance compensation, wherein the first frame queue includes a plurality of consecutive frames; and a luminance compensation module 201 configured to be turned on to perform the luminance compensation on at least part of the consecutive frames in the first frame queue if the frequency variation pattern of the first frame queue satisfies the condition of the luminance compensation, and further configured to be turned off if the frequency variation pattern of the first frame queue does not satisfy the condition of the luminance compensation.

In this embodiment, the detection module is configured to detect whether the frequency variation pattern of the first frame queue is a first pattern.

Under the first pattern, a frequency of the plurality of consecutive frames in the first frame queue continuously alternates at least twice between a first frequency and a second frequency. An absolute value of a difference between the first frequency and the second frequency is greater than or equal to a first preset threshold. The condition of the luminance compensation includes the first pattern.

In this embodiment, the detection module is further configured to detect whether a frequency of a plurality of consecutive frames in a second frame queue changes, and if yes, detection is stopped to wait for a first preset time. The second frame queue is before the first frame queue. An interval duration between the first frame queue and the second frame queue is equal to the first preset time.

Before detecting whether the frequency variation pattern of the first frame queue satisfies the condition of the luminance compensation, if the frequency of the plurality of consecutive frames in the second frame queue before the first frame queue is detected to change, the first preset time is waited to stabilize signals, so as to prevent signal instability from causing errors in the detection of the frequency variation pattern of the first frame queue.

In this embodiment, the detection module is configured to detect whether the frequency variation pattern of the first frame queue is a second pattern. The second pattern includes a first sub-pattern and a second sub-pattern, which are continuous. The condition of the luminance compensation includes the second pattern.

Under the first sub-pattern, a frequency of adjacent two of the consecutive frames changes from a third frequency to a fourth frequency. The third frequency is greater than the fourth frequency. A difference between the third frequency and the fourth frequency is greater than or equal to a second preset threshold.

Under the second sub-pattern, in at least two of the consecutive frames, a difference between a frequency of a next one of the consecutive frames and a frequency of a previous one of the consecutive frames is greater than or equal to zero and is less than or equal to a third preset threshold.

In this embodiment, after the detection module is turned off, the detection module is further configured to wait for a second preset time and detect whether a frequency variation pattern of a plurality of consecutive frames in a third frame queue after the second preset time satisfies the condition of the luminance compensation.

The luminance compensation module is further configured to display at least part of the consecutive frames in the third frame queue if the frequency variation pattern of the plurality of continuous frames in the third frame queue satisfies the condition of the luminance compensation. The luminance compensation module is further configured to be turned off if the frequency variation pattern of the plurality of consecutive frames in the third frame queue does not satisfy the condition of the luminance compensation.

The luminance compensation device provided by the present application performs the luminance compensation on at least part of the consecutive frames satisfying the condition of the luminance compensation, and performs the luminance compensation on the consecutive frames not satisfying the condition of the luminance compensation. While relieving the flickering problem, the problem that the luminance compensation applied to the display device with the free synchronization technology of traditional technology causing display of special images to deteriorate is prevented.

The present application further provides a display device. The display device can be a liquid crystal display device or an organic light-emitting diode display device. The display device includes the above luminance compensation device.

The description of embodiments above is only for helping to understand technical solutions of the present application and its core idea. Understandably, for a person of ordinary skill in the art can make various modifications of the technical solutions of the embodiments of the present application above. However, it does not depart from the scope of the technical solutions of the embodiments of the present application.

What is claimed is:

1. A luminance compensation method, comprising steps of:

detecting whether a frequency variation pattern of a first frame queue satisfies a condition of luminance compensation, wherein the first frame queue comprises a plurality of consecutive frames;

if yes, turning on a luminance compensation module, wherein the luminance compensation module is configured to perform the luminance compensation on at least part of the consecutive frames in the first frame queue; and if no, turning off the luminance compensation module;

wherein the step of detecting whether the frequency variation pattern of the first frame queue satisfies the condition of the luminance compensation further comprises a step of:

detecting whether the frequency variation pattern of the first frame queue is a first pattern;

wherein under the first pattern, a frequency of the plurality of consecutive frames in the first frame queue continuously alternates at least twice between a first frequency and a second frequency, an absolute value of a difference between the first frequency and the second frequency is greater than or equal to a first preset threshold, and the condition of the luminance compensation comprises the first pattern.

2. The luminance compensation method according to claim 1, wherein before the step of detecting whether the frequency variation pattern of the first frame queue satisfies the condition of the luminance compensation, the luminance compensation method further comprises a step of:

detecting whether a frequency of a plurality of consecutive frames in a second frame queue changes, and if yes, stopping detection and waiting a first preset time;

wherein the second frame queue is before the first frame queue, and an interval duration between the first frame queue and the second frame queue is equal to the first preset time.

3. The luminance compensation method according to claim 1, wherein the step of detecting whether the frequency variation pattern of the first frame queue satisfies the condition of the luminance compensation further comprises a step of:

detecting whether the frequency variation pattern of the first frame queue is a second pattern, wherein the second pattern comprises a first sub-pattern and a second sub-pattern, which are continuous, and the condition of the luminance compensation comprises the second pattern;

wherein under the first sub-pattern, a frequency of adjacent two of the consecutive frames changes from a third frequency to a fourth frequency, the third frequency is greater than the fourth frequency, and a difference between the third frequency and the fourth frequency is greater than or equal to a second preset threshold;

under the second sub-pattern, in at least two of the consecutive frames, a difference between a frequency of a next one of the consecutive frames and a frequency of a previous one of the consecutive frames is greater than or equal to zero and is less than or equal to a third preset threshold.

4. The luminance compensation method according to claim 1, wherein after the step of the turning off the luminance compensation module, the luminance compensation method further comprises steps of:

waiting a second preset time;

detecting whether a frequency variation pattern of a plurality of consecutive frames in a third frame queue after the second preset time satisfies the condition of the luminance compensation;

if yes, turning on the luminance compensation module, wherein the luminance compensation module performs the luminance compensation on at least part of the consecutive frames in the third frame queue; and if no, turning off the luminance compensation module.

5. The luminance compensation method according to claim 1, wherein after the step of turning on the luminance compensation module, the luminance compensation method further comprises steps of:

detecting whether a frequency variation pattern of a plurality of consecutive frames in a fourth frame queue after the first frame queue satisfies the condition of the luminance compensation;

if yes, keeping the luminance compensation module turned on, wherein the luminance compensation module performs the luminance compensation on at least part of the consecutive frames in the fourth frame queue; and if no, turning off the luminance compensation module which has been turned on.

6. A luminance compensation device, comprising:

a detection module configured to detect whether a frequency variation pattern of a first frame queue satisfies a condition of luminance compensation, wherein the first frame queue comprises a plurality of consecutive frames; and a luminance compensation module configured to be turned on to perform the luminance compensation on at least part of the consecutive frames in the first frame queue if the frequency variation pattern of the first frame queue satisfies the condition of the luminance compensation, and further configured to be turned off if the frequency variation pattern of the first frame queue does not satisfy the condition of the luminance compensation;

wherein the detection module is configured to detect whether the frequency variation pattern of the first frame queue is a first pattern; and under the first pattern, a frequency of the plurality of consecutive frames in the first frame queue continuously alternates at least twice between a first frequency and a second frequency, an absolute value of a difference between the first frequency and the second frequency is greater than or equal to a first preset threshold, and the condition of the luminance compensation comprises the first pattern.

7. The luminance compensation device according to claim 6, wherein the first preset threshold ranges from 6 Hz to 12 Hz.

8. The luminance compensation device according to claim 6, wherein the detection module is further configured to detect whether a frequency of a plurality of consecutive frames in a second frame queue changes, and if yes, detection is stopped to wait for a first preset time; and the second frame queue is before the first frame queue, and an interval duration between the first frame queue and the second frame queue is equal to the first preset time.

9. The luminance compensation device according to claim 6, wherein the detection module is configured to detect whether the frequency variation pattern of the first frame queue is a second pattern, the second pattern comprises a first sub-pattern and a second sub-pattern, which are continuous, and the condition of the luminance compensation comprises the second pattern;

under the first sub-pattern, a frequency of adjacent two of the consecutive frames changes from a third frequency to a fourth frequency, the third frequency is greater than the fourth frequency, and a difference between the third frequency and the fourth frequency is greater than or equal to a second preset threshold;

under the second sub-pattern, in at least two of the consecutive frames, a difference between a frequency of a next one of the consecutive frames and a frequency of a previous one of the consecutive frames is greater than or equal to zero and is less than or equal to a third preset threshold.

10. The luminance compensation device according to claim 9, wherein the second preset threshold ranges from 50 Hz to 70 Hz, and the third preset threshold ranges from 1 Hz to 2 Hz.

11. The luminance compensation device according to claim 6, wherein after the detection module is turned off, the detection module is further configured to wait for a second preset time and detect whether a frequency variation pattern of a plurality of consecutive frames in a third frame queue after the second preset time satisfies the condition of the luminance compensation;

the luminance compensation module is further configured to be turned on to perform the luminance compensation on at least part of the consecutive frames in the third frame queue if the frequency variation pattern of the plurality of consecutive frames in the third frame queue satisfies the condition of the luminance compensation; and the luminance compensation module is further configured to be turned off if the frequency variation pattern of the plurality of consecutive frames in the third frame queue does not satisfy the condition of the luminance compensation.

12. A display device, comprising a luminance compensation device, wherein the luminance compensation device comprises:

a detection module configured to detect whether a frequency variation pattern of a first frame queue satisfies a condition of luminance compensation, wherein the first frame queue comprises a plurality of consecutive frames; and a luminance compensation module configured to be turned on to perform the luminance compensation on at least part of the consecutive frames in the first frame queue if the frequency variation pattern of the first frame queue satisfies the condition of the luminance compensation, and further configured to be turned off if the frequency variation pattern of the first frame queue does not satisfy the condition of the luminance compensation;

wherein the detection module is configured to detect whether the frequency variation pattern of the first frame queue is a first pattern; and under the first pattern, a frequency of the plurality of consecutive frames in the first frame queue continuously alternates at least twice between a first frequency and a second frequency, an absolute value of a difference between the first frequency and the second frequency is greater than or equal to a first preset threshold, and the condition of the luminance compensation comprises the first pattern.

13. The display device according to claim 12, wherein the detection module is further configured to detect whether a frequency of a plurality of consecutive frames in a second frame queue changes, and if yes, detection is stopped to wait for a first preset time; and the second frame queue is before the first frame queue, and an interval duration between the first frame queue and the second frame queue is equal to the first preset time.

14. The display device according to claim 12, wherein the detection module is configured to detect whether the frequency variation pattern of the first frame queue is a second pattern, the second pattern comprises a first sub-pattern and a second sub-pattern, which are continuous, and the condition of the luminance compensation comprises the second pattern;

under the first sub-pattern, a frequency of adjacent two of the consecutive frames changes from a third frequency to a fourth frequency, the third frequency is greater than the fourth frequency, and a difference between the third frequency and the fourth frequency is greater than or equal to a second preset threshold;

under the second sub-pattern, in at least two of the consecutive frames, a difference between a frequency of a next one of the consecutive frames and a frequency of a previous one of the consecutive frames is greater than or equal to zero and is less than or equal to a third preset threshold.

15. The display device according to claim 12, wherein after the detection module is turned off, the detection module is further configured to wait for a second preset time and detect whether a frequency variation pattern of a plurality of consecutive frames in a third frame queue after the second preset time satisfies the condition of the luminance compensation;

the luminance compensation module is further configured to be turned on to perform the luminance compensation on at least part of the consecutive frames in the third frame queue if the frequency variation pattern of the plurality of consecutive frames in the third frame queue satisfies the condition of the luminance compensation; and the luminance compensation module is further configured to be turned off if the frequency variation pattern of the plurality of consecutive frames in the third frame queue does not satisfy the condition of the luminance compensation.

* * * * *